Sept. 13, 1927.

J. C. CARLTON

CLUTCH MECHANISM 1,642,642

Original Filed March 23, 1922    2 Sheets-Sheet 1

Inventor
Jack C. Carlton

By Wood & Wood
Attorneys

Sept. 13, 1927.

J. C. CARLTON

CLUTCH MECHANISM 1,642,642

Original Filed March 23, 1922    2 Sheets-Sheet 2

Inventor
Jack C. Carlton
By Wood & Wood
Attorneys

Patented Sept. 13, 1927.

1,642,642

UNITED STATES PATENT OFFICE.

JACK C. CARLTON, OF CINCINNATI, OHIO, ASSIGNOR TO THE CARLTON MACHINE TOOL COMPANY, OF CINCINNATI, OHIO, A CORPORATION OF OHIO.

CLUTCH MECHANISM.

Original application filed March 23, 1922, Serial No. 546,137. Divided and this application filed March 2, 1926. Serial No. 91,691.

My invention relates to friction clutches of a class particularly adaptable for the reversing gearing of a radial drill.

An object of the invention is to provide a friction clutch in which the driving and driven clutch members, having friction disk elements interposed therebetween, are brought into frictional cooperation under a determined spring pressure for a yielding automatic coupling of the clutch parts, and to further provide lever means for positively retracting one of the clutch members for unclutching.

Another object of the invention is to mount the clutch mechanism as a unit upon a tubular spindle, having its opposite ends journaled in ball bearings, with a power transmitting shaft extended through the sleeve and splined thereto, for allowing translation of the spindle and related mechanism longitudinally of the shaft.

Another object of the invention is to provide a friction clutch in which the driving and driven clutch members are adapted to frictionally cooperate compressively, the compression force being applied by a plurality of springs, having their axes extending longitudinally with the direction of the clutch compression motion, the springs being disposed in equipoise about the axis of the clutch member, for a centralized compression and movement of the member, both rotatively and translatively.

Another object of the invention is to provide a friction clutch in which the clutch members, for rotative connection, are compressively brought together by the pressure of springs housed within the hub of one of the clutch members, as a slidable member and controlled by one or more levers also housed and mounted within the hub of said member, the levers actuated by a collar slidable upon the hub of said member, the organization producing a very compact structure.

Another object of the invention is to provide a perfectly balanced friction clutch, adapted for high speeds, in which the clutch elements are engaged under a yielding compression, so as to slide upon one another under overload torque strains.

Another object of my invention is to provide a very efficient quick change reversing gear transmission for high speeds with the elements compactly combined.

Other objects and advantages relate to the utilization of the clutches for reversing gearing mechanism, for alternately transmittingly connecting a set of reversing gears, with the clutches and reversing gears mounted upon a sleeve or spindle, all of which will be more fully set forth in the description of the accompanying drawings, forming a part of this application, in which drawings like reference characters denote corresponding parts throughout the several views, of which:

Figure 1:
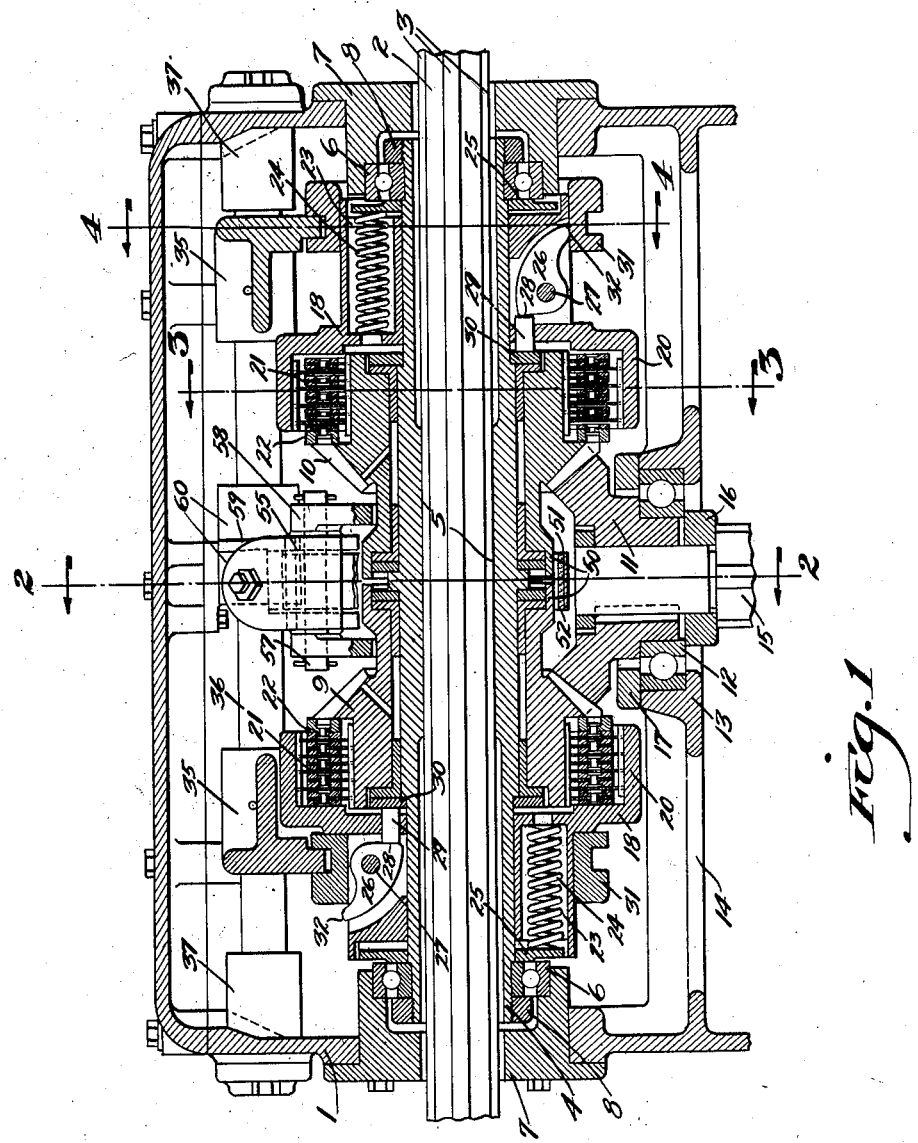
Figure 1 is a central vertical section of my improved reversing gearing.

This invention is divisional of co-pending application Serial No. 546,137, which application is drawn to a braking mechanism operating in conjunction with the friction clutches of a reversing gearing.

Referring to the drawings, 1 indicates a casing housing for the gearing and provides support and bearings for the various shafts. A shaft 2 projects through the casing which, for identification purposes, may be designated as a driving shaft, and, since the gearing has special application to a radial drill, as the horizontal arm shaft for transmitting motion to a drill spindle, journaled within a head-stock. The shaft under such condition extends parallel with the drill arm, and the head-stock is translatable upon the arm with the reversing gear as a part of the head-stock adjustable upon the arm. This necessitates a splined connection between the shaft 2 and the driven elements directly connecting therewith as a means for maintaining a driving connection between the parts at any adjusted position of the head-stock upon the drill arm. Therefore, the invention embodies mechanism of a detail of construction primarily adaptable for the particular contemplated use herein set forth, and thereby possesses combinations not generally required for other uses.

Figure 4:
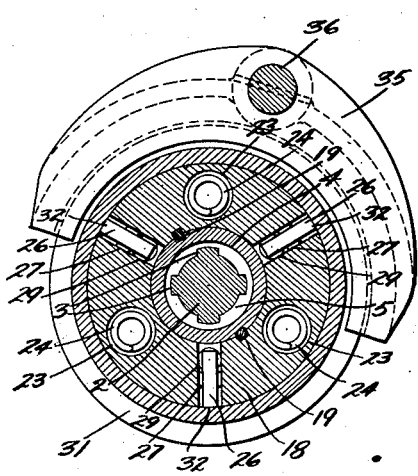
Figure 4 is a sectional view taken on line 4—4, Figure 1 showing a shifter element and clutch mechanism.

The shaft 2 constitutes a longitudinally ribbed bar, four ribs 3 being shown arranged in diametrically disposed pairs as keys extending approximately the entire length of the shaft, or for the lengthwise adjustment of the gearing longitudinally upon the shaft. The shaft extends freely through the casing and is suitably journaled in bearings not shown. The ribs or keys 3 of the shaft extend into and through longitudinal grooves in the sleeve 4 concentrically disposed about the shaft and journaled within bearings carried by the casing. As shown, the bore of the sleeve, intermediate of the sleeve length, presents a small internal diameter to provide longitudinal lugs or ribs 5, formed by longitudinally grooving the interior medial portion of the sleeve, the ribs of the shaft extending into the grooves of the sleeve and cooperatively engaging with the ribs 5 for transmittingly connecting the shaft and sleeve and permitting the sleeve to be longitudinally adjusted or translated upon the shaft. The sleeve at its opposite ends is engaged through ball race-way rings as elements of a ball-bearing fixture 6, forming bearings for the sleeve. These ball-bearing fixtures are recessed respectively into the ends of bearing collars 7, engaged respectively into the opposite ends of the casing and secured to the casing concentrically about the shaft 2. The ball-bearing fixtures at the opposite ends of the sleeve are held against longitudinal outward displacement by nuts 8—8, respectively having threaded engagement with the ends of the sleeve 4. The sleeve is counter-turned to provide shoulders for the various parts mounted upon the sleeve to hold the same against lateral displacement inwardly. Numerals 9 and 10 indicate a pair of oppositely disposed bevel gears loosely mounted upon the sleeve bushings, said bushings being interposed between the gears and sleeve to provide bearing surfaces for the gears upon the sleeve. The bevelled gears 9 and 10 are constantly intermeshed with an intermediate bevel gear 11, journaled in a ball-bearing fixture 12, recessed in a hub 13, of the side wall 14 of the casing. The gear 11 is keyed upon the end of a shaft 15, which may be designated as a driven shaft. One element of the ball-bearing fixture is seated upon the counter-turned end of the gear hub and is secured thereto against displacement by a collar 16, and the fixture is secured against displacement within the hub 13, of the frame or casing by a collar 17. The gears 9 and 10 are adapted to be alternately clutched to the sleeve by friction clutches. The clutches for the gears are of duplicate construction and therefore the detailed description thereof will be confined to the singular. The friction clutch for each gear comprises a sleeve member 18, concentrically mounted upon the sleeve 4 and keyed thereto by the keys 19—19, (see Fig. 4), for rotatively connecting said parts as a unit. This sleeve member 18 is provided with a hub end 20, forming a socket for the friction rings 21, of a plural number, arranged side by side, for frictional cooperation as a unit, at one side having a side face contact against the inner face of the diametric radial wall of the hub and having its opposite side face against a friction plate annulus 22. This annulus bears against the gear 10 and is keyed upon the gear, the gear hub being provided with a plurality of teeth engaging into corresponding notches cut into the annulus. The friction rings 21, in their series relation, are in alternate arrangement respectively keyed to the gear hub and to the annular flange of the hub of the friction clutch member or sleeve 18. The annular flange of the clutch member 18 internally and the hub of the gear as a companion clutch member externally are provided with teeth engaging into corresponding notches in the respective disks interposed between said members. Thus, one friction disk is keyed to the friction member 18, and its next adjacent disk is keyed to the hub of the gear, these friction disks comprising metal disks having fiber disks fixed to their opposite side faces, a type of friction disks of commercial form well-known in the art, no claim being made herein to the construction or employment of the ring type of friction disks arranged in series side by side alternately connecting with the driving element of the clutch and the driven element of the clutch. The clutch member 18 is bored longitudinally or axially to provide spring pockets 23, three being employed. Each pocket carries a spring 24, one end thereof bearing against the base of the pocket for exerting pressure against the friction member 18 and the opposite end of the spring bearing against a disk 25, mounted upon the sleeve 4 adjacent to and abutting the ball-bearing fixture 6. The spring is inserted under compression to a degree which will force the clutch member 18 toward the gear for frictionally engaging the friction disks and transmittingly connecting the hub of the friction member 18 with the gear, under a pressure for a determined driving power transmission. This structure permits the clutch to yield, allowing slippage between said clutch member 18 and gear to which it connects under an excessive power transmission or counter-resistance to the power exerted by the driven gear 11 and its related transmission mechanism.

Figure 2:
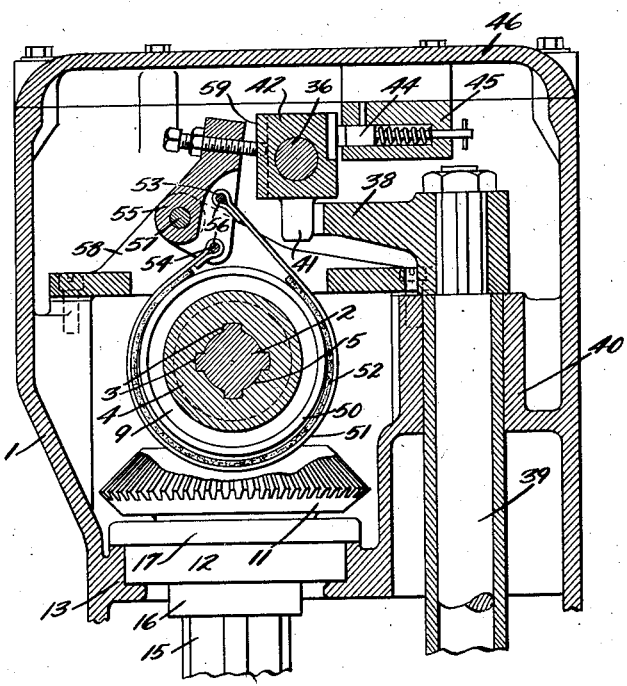
Figure 2 is a sectional view taken on line 2—2, Figure 1 showing the means for actuating the shaft carrying the clutch shifting elements.
Figure 3:
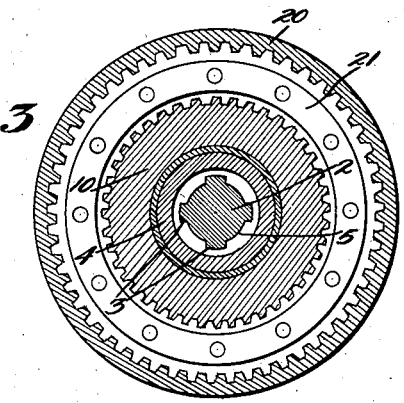
Figure 3 is a sectional view taken on line 3—3, Figure 1 illustrating the clutch structure.

The spring construction provides for an automatic friction connection between the driving and driven elements when the clutch member 18 is released to permit it to be moved by the pressure of the springs, so that the springs move the clutch member 18 automatically to an active position. Mechanical means are provided for releasing the friction clutch from its power transmitting connection by moving the member 18 in an opposite direction to a neutral position. The means for moving the clutch member 18 to its neutral position comprises a series of cams or cam levers 26, three being employed, uniformly disposed and spaced about the clutch member 18. These cam levers are mounted within radial grooves or slots cut into the clutch member 18 to dispose the levers within the periphery of the clutch member. Each cam lever is pivoted upon a pin 27, engaged into the body of the clutch member 18 and is provided with a cam projection 28, engaging a pin 29, extended through the clutch member 18, parallel with the axis of said clutch member and abutting a disk 30, shouldered upon the sleeve 4, whereby the disk 30 provides an abutment for pins 29, and cam levers 26 for moving the clutch member 18 laterally or axially upon the sleeve in an outward or clutch releasing direction. The cam levers move the clutch member in opposition to the springs. The cam levers are rocked by a collar 31, loosely concentrically mounted upon the periphery of the body portion of the clutch member 18, so as to be slidable axially thereon for engaging the nose ends 32, of the cam levers 26, to swing the same inwardly, as shown in the clutch at the right in Fig. 1, for a clutch release. A clutching operation is accomplished by moving the collar 31 to the left, and this movement for a determined distance will bring the collar 31 to a point which will uncover the nose ends 32, of the cam levers, releasing or disengaging said levers from the collar 31, and allowing the levers to swing outwardly, as shown in the clutch at the left, Fig. 1. The edge surfaces of the nose ends of the cam levers are angled or flattened for a free cooperation with the inner bored surface of the clutch actuating collar 31, said clutch actuating collar 31 simultaneously actuating all of the cam levers 26 of the series. The clutch actuating collar 31, for the clutch mechanism of gear 9, and the clutch actuating collar 31 for the clutch mechanism of the gear 10, are connected together for simultaneously moving the collars to produce an alternate control for the friction clutches, so that the gears 9 and 10 are alternately connected and disconnected, rendering it impossible to frictionally connect both gears to the sleeve simultaneously. The mechanism, however, is of such arrangement as to permit both clutches to be released for neutralized clutch control in cutting out the transmission to the gear 11. Each of the shiftable collars 31 is annularly grooved to receive a yoke 35, fixed to a rod 36, the opposite ends of the rod 36 being respectively slidably engaged and supported in the hub caps or bearing thimbles 37—37, bolted to the casing 1. The rod is reciprocated by an arm 38, fixed upon the end of a rock shaft 39, supported and journaled in a bearing 40, (see Fig. 2) integral with the casing 1. The arm 38 has its end forked to engage a pin projection 41, depending from the block 42, fixed to the rod 36. Thus any swinging movement of the arm 38 will correspondingly move the rod 36 and shifter collars 31 for simultaneous control of the clutches in alternate capacities, for connecting one of the oppositely disposed bevel gears, transmittingly with the sleeve 4. The clutch members 18 of the two alternately operable clutches being both moved to their operative positions by the springs 23, it will be apparent that it would be detrimental if the clutch members 18 were permitted to be simultaneously released from the cam lever control, as this would permit both clutches to be in operative positions at the same time. The shifter collars 31 cooperate with their respective cam levers within the limits of shifter movement, to a degree which will not permit simultaneous release of the cam levers of both clutches. The shifter collars, therefore, are, at the intermediate position of their translatable movement, engaged with their respective sets of cam levers, thus releasing the clutch member 18 of each clutch to maintain both clutches in neutral or disengaged position. The slide or shifter collars move transversely to the swing of the cam levers, and the lever ends are thus adapted to swing about one end of the collar when disengaged therefrom. When thus disengaged and swung, the levers act as latches substantially opposing accidental movement of the collars by the clutch springs of the opposite clutch member. When the cam levers of both clutches are simultaneously engaged and depressed by their collars, the springs are in equilibrium and both clutches are inoperatively sustained.

The block 42, fixed upon the shifter rod 36, on one side is provided with a V-notch, into which the spring actuated detent 44 engages, for releasably latching the rod in its mid-way or neutral clutch controlling position. The detent 44 is slidably mounted in a bracket 45, extended from the cover plate 46 of the casing.

The mechanism can be quickly and easily operated to simultaneously disengage one clutch and engage the other or to simultaneously disengage both clutches, and it is unnecessary to lock the shifting mechanism at limits of its clutch controlling movement.

Braking mechanism is therefore provided for the reversing gears operative with the clutch control for applying a braking pressure to the gears as the clutch controlling mechanism moves into its neutral position.

This holds the reversing gears or driven members against rotation and causes an immediate separation of the clutch disks, so that a reversing control can be quickly made without injury to the parts. In the present structure a single brake band is employed for braking bevel gears 9 and 10, possible by reason of their adjacently disposed hubs, the brake strap or band being central thereof to overlap and engage with the hubs of both gears. The hubs of bevel gears 9 and 10 are provided with annular flanges 50 respectively housing the gear spacing washers on the spindle or sleeve 4. The flanges provide brake rims for their respective gears about which a brake strap or band 51 is adapted to be engaged. The brake band is provided with a lining 52 for engaging the hub rims of the gears 9 and 10. The opposite ends of the band are looped to provide eyes for connecting the band ends as at 53, 54, to rock lever 55. The rock lever is recessed or notched to receive the ends of the brake band and carries pins 56 engaged respectively through the eyes of the band. The band connection with the lever is arranged to move the bank ends in opposite directions to reduce the lever motion for the braking operations. This arrangement of the brake band ends relative to the pivot of the block is well known. The brake lever 55 is pivoted upon a pin 57 supported in a pair of bearing plates 58 at opposite sides of the brake lever, combined as a cross frame having its opposite ends fixed to the casing and straddling the brake rims of the gears, providing a very substantial support for the brake lever. The free end of the brake lever has an adjusting screw transversely projecting therethrough engaging with the block 42, of the clutch shifting rod 36. The block is designed to serve as a cam providing a central apex 59 developed from opposingly inclined retreat surfaces 60, 60, at opposite sides of said apex, for actuating the brake lever with the reciprocation of said coupling block or clutch actuating rod in either right or left strokes.

The apex of the cam surface coacts with the brake lever when the cam block of the clutch shifter is in neutral position, so that the brake is applied to gears 9 and 10 when idle or unclutched. It is therefore impossible to unclutch one gear and clutch the second without interveningly applying the brake to the gears, for arresting the transmitting inertia of either one of them. Quickly arresting the inertia of the gears results in setting up a counterinfluence between the opposing disks of the clutch, effecting a clutch disk separation between those of a series as driving from those of a series as driven.

Having described my invention, I claim:

In a device of the nature disclosed, a spindle, driving and driven clutch members mounted on said spindle, friction disks interposed between said members and adapted to be frictionally connected under compression, one of said clutch members being translatable upon said spindle toward and from the other, springs carried by said clutch member for exerting pressure upon said members and disks, lever means carried by said translatable clutch member for translating the same in a clutch retracting direction, and a collar mounted upon said translatable clutch member and slidable for actuating said lever means.

In witness whereof, I hereunto subscribe my name.

JACK C. CARLTON.